United States Patent [19]

Wear

[11] 4,170,956
[45] Oct. 16, 1979

[54] THERMALLY-RESPONSIVE INDICATING DEVICE

[75] Inventor: Robert L. Wear, West St. Paul, Minn.

[73] Assignee: Minnesota Mining and Manufacturing Company, St. Paul, Minn.

[21] Appl. No.: 886,058

[22] Filed: Mar. 13, 1978

Related U.S. Application Data

[63] Continuation-in-part of Ser. No. 799,207, May 23, 1977, abandoned, which is a continuation-in-part of Ser. No. 722,678, Sep. 13, 1976, abandoned.

[51] Int. Cl.² ............................................. G01K 1/02
[52] U.S. Cl. ..................................... 116/218; 73/358; 116/206; 252/408
[58] Field of Search ..................... 252/408; 116/114.5, 116/114 Y, 106, 206, 218; 73/358; 99/342; 426/88

[56] References Cited

U.S. PATENT DOCUMENTS

| | | | |
|---|---|---|---|
| 3,140,611 | 7/1964 | Kliewer | 73/358 |
| 3,280,629 | 10/1966 | Kliewer | 73/358 |
| 3,626,897 | 12/1971 | Kliewer | 116/114.5 |
| 3,656,452 | 4/1972 | Kliewer | 116/114.5 |
| 3,682,130 | 8/1972 | Jeffers | 116/114.5 |
| 3,965,849 | 6/1976 | Gee | 116/114.5 |

*Primary Examiner*—Benjamin R. Padgett
*Assistant Examiner*—J. L. Barr
*Attorney, Agent, or Firm*—Cruzan Alexander; Donald M. Sell; James V. Lilly

[57] ABSTRACT

A thermally-responsive indicating device comprising a housing which defines a cavity therein, an indicating means in said cavity, a biasing means in said cavity, and a class of nitrogen-containing organic locking means in said cavity, wherein said locking means is adapted to fuse at a predetermined temperature.

21 Claims, 3 Drawing Figures

THERMALLY-RESPONSIVE INDICATING DEVICE

CROSS REFERENCE TO RELATED APPLICATION

This is a continuation-in-part of copending application Ser. No. 799,207, filed May 23, 1977 which was a continuation-in-part of Ser. No. 722,678, filed Sept. 13, 1976, both now abandoned.

BACKGROUND OF THE INVENTION

This invention relates to thermally-responsive indicating devices. More particularly, it relates to devices which indicate the attainment of predetermined temperatures.

Thermally-responsive indicating devices are especially useful in preparing foods, particularly meats and fowl. By providing means by which the device indicates the attainment of predetermined temperatures, such devices can signal the degree of "doneness" of the food.

Such devices are, of course, known as exemplified by the number of patents issued thereon. Thus, see, for example, U.S. Pat. Nos. 3,140,611; 3,280,629; 3,479,876; 3,548,780; 3,559,615; 3,626,897; 3,656,452; 3,682,120; 3,693,579; and 3,965,849. The devices described in these patents employ fusible latching means for normally securing the indicating means in a non-indicating position relative to the housing of the device. Typically, the latching means employed in these devices comprise metal alloys or waxes.

While devices employing such latching means have proven useful, they have certain drawbacks. For example, the metal alloys are high density materials. Thus, in addition to being expensive, relatively large quantities of alloy must be utilized in order to provide a given volume of latching means thereby adding to the expense of such means. Moreover, such alloys are typically prepared from toxic substances such as bismuth, lead, cadmium, tin, etc.

Waxes have been suggested as replacements for metal alloys. However, they have not proven entirely satisfactory. Typically, waxes fuse over a relatively wide temperature range (e.g., 5° C. or more). Thus, they do not provide a quick response when a predetermined temperature has been attained. Moreover, some of such waxes can be extracted from the indicating device during preparation of the food.

The present invention overcomes these disadvantages. It provides a thermally-responsive indicating device which employs a locking means that comprises a class of nitrogen-containing organic materials. This locking means is substantially less dense and less expensive than a corresponding volume of the metal alloys. Thus, devices of the invention require significantly less of the locking means per unit volume and thereby afford substantial cost savings. Moreover, the toxic alloys are replaced with materials which are considered nontoxic and, in the most preferred case, exhibit essentially no acute oral toxicity. Furthermore, the organic locking means employed in the present invention typically fuse over a narrow temperature range (e.g., 3° C. or less) and are generally resistant to extraction from the device by water and cooking fats and oils. Thus, devices of the present invention are safe and provide a quick and accurate response upon attainment of a predetermined temperature.

SUMMARY OF THE INVENTION

In accordance with the present invention, there is provided a thermally-responsive indicating device comprising a housing which defines a cavity closed at one end and open at the other end, an indicating means within said cavity for movement relative to said housing, a biasing means within said cavity for urging the movement of said indicating means relative to said housing, and a fusible locking means within said cavity which is solid at about 20° C. and is adapted to fuse at a predetermined temperature and wherein said locking means has the formula

wherein $R^1$ is selected from

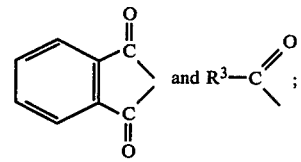

$R^2$ is selected from saturated aliphatic radicals; aryl radicals and aryl-substituted aliphatic radicals; $R^3$ is a saturated aliphatic radical containing from about 1 to 20 carbon atoms; and n is 0 or 1; provided that (i) when $R^1$ is

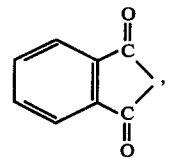

n is 0 and $R^2$ is a saturated aliphatic radical and (ii) when $R^1$ is

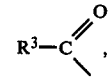

n is 1, and $R^2$ is selected from saturated aliphatic radicals, aryl radicals and aryl-substituted aliphatic radicals; and provided further that the sum of the number of carbon atoms in $R^1$ and $R^2$ is at least about 10 and preferably is at least about 14.

The present invention is described in more detail hereinafter with reference to the accompanying drawings wherein like reference characters refer to the same parts throughout the several views and in which.

DETAILED DESCRIPTION OF THE INVENTION

Figure 1:
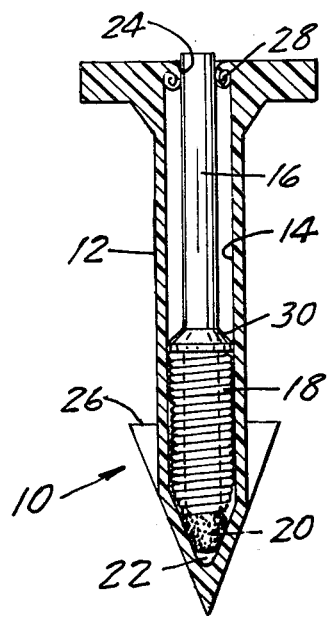
FIG. 1 is a cross-sectional view of a preferred embodiment of the invention having an indicator rod in a lowered position relative to the body of the device.

The devices of the invention employ a class of compounds of formula I as the locking means. The locking means has a relatively sharp trigger temperature (defined hereinafter). Thus, while it may trigger over a range of temperatures that range is no greater than about 3° C. Moreover, the locking means is stable under severe storage and use conditions (e.g., 100 percent relative humidity and 50° C.). Thus, when exposed to severe conditions for a period of 30 days, it does not exhibit any substantial change in trigger temperature (e.g., a change of less than about 6° C. and preferably a change of less than about 3° C.). Long chain compounds of formula I (i.e., those containing at least about 14 carbon atoms) are particularly stable under severe storage and use conditions.

Additionally, the preferred locking means are also virtually impossible to extract from the indicating device when exposed to conditions which simulate the cooking environment. Thus, the danger of accidental oral ingestion by humans is very remote.

As used herein, the term "trigger temperature" refers to that temperature, or range of temperatures, at which the indicating devices signal the attainment of their predetermined temperature. The trigger temperature may be easily determined. Thus, five gauges are suspended in an appropriate liquid bath so that the tip and most of the body of each of the devices (but not the top), is submerged. The temperature of the bath is controlled so that it cycles within a ±0.55° C. temperature band. The bath is held in each band for two minutes after which the temperature is raised in 0.55° C. increments to the next band. The number of devices that fire in each band is recorded.

Extraction tests are performed on separate gauges in separate water and heptane baths. Devices containing a 50 percent by weight excess of the locking means and having a nylon 6 (food grade) body are used. The water bath simulates the effect of water on the device during cooking. The heptane bath simulates the effect of fats and oils on the device during cooking. Water extraction tests are performed at 118° C. under sufficient pressure to prevent the water from boiling off. Heptane extraction tests are performed at a temperature of about 3° C. above the melting point of the locking means being tested. The tests are run by submerging the tip and lower portion of each of the devices in the appropriate bath at said temperature for two hours. The water or heptane is then evaporated to determine the amount of locking means extracted thereby.

One class of preferred compounds coming within formula I are the aromatic amides of the formula

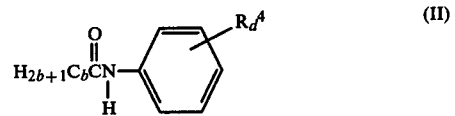

(II)

wherein $R^4$ is a lower alkyl group containing from about 1 to 4 carbon atoms; b is an integer of from about 4 to 20; and d is 0 or 1.

In formula II when d is 1, $R^4$ is preferably a methyl group which is ortho or para to the amide group. Additionally, b is preferably from about 7 to 17 and most preferably about 13.

The most preferred compound of formula II is myristanilide. This compound exhibits essentially no acute oral toxicity. Consequently, there is virtually no danger from its accidental oral ingestion by humans.

Another class of useful compounds coming within formula I are the aliphatic amides of the formula

(III)

wherein $R^3$ is as described above and $R^5$ is selected from saturated aliphatic radicals and aryl-substituted aliphatic radicals containing from about 1 to 20 carbon atoms, provided that the sum of the number of carbon atoms in $R^3$ and $R^5$ is at least about 13.

Yet another class of useful compounds coming within formula I are the N-alkyl phthalimides of the formula

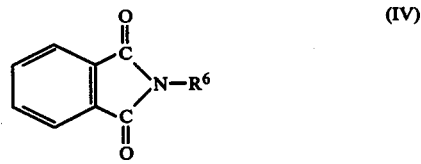

(IV)

wherein $R^6$ is a saturated aliphatic radical of at least about 6 carbon atoms.

Representative examples of compounds of formula I, their melting points, and their average trigger temperatures are set forth in Table I below. The melting points were determined by the Fisher-Johns Method.

TABLE I

| COMPOUND | FORMULA | MELTING POINT (°C.) | AVERAGE TRIGGER TEMPERATURE (°C.) |
|---|---|---|---|
| Valeranilide | 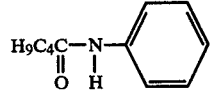 | 60–62 | 62 |
| Caprylanilide | 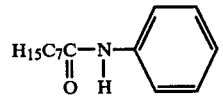 | 50–51 | 52 |
| Pelargonanilide | 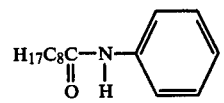 | 55–56 | 56 |

TABLE I-continued

| COMPOUND | FORMULA | MELTING POINT (°C.) | AVERAGE TRIGGER TEMPERATURE (°C.) |
|---|---|---|---|
| Capranilide | $H_{19}C_9\text{C(=O)NH-C}_6H_5$ | 63–65.5 | 64 |
| Lauranilide | $H_{23}C_{11}\text{C(=O)NH-C}_6H_5$ | 76.5–77 | 77 |
| Myristanilide | $H_{27}C_{13}\text{C(=O)NH-C}_6H_5$ | 83.5–84.5 | 84 |
| Stearanilide | $H_{35}C_{17}\text{C(=O)NH-C}_6H_5$ | 93.5–95 | 94 |
| Enanth-p-toluidide | $H_{13}C_6\text{C(=O)NH-C}_6H_4\text{-CH}_3$ | 78.5–79.5 | 79 |
| Pelargon-p-toluidide | $H_{17}C_8\text{C(=O)NH-C}_6H_4\text{-CH}_3$ | 81.5–82.5 | 82 |
| Capr-p-toliudide | $H_{19}C_9\text{C(=O)NH-C}_6H_4\text{-CH}_3$ | 75.5–76.5 | — |
| Undecano-p-toluidide | $H_{21}C_{10}\text{C(=O)NH-C}_6H_4\text{-CH}_3$ | 77.5–78.5 | — |
| Laur-o-toluidide | $H_{23}C_{11}\text{C(=O)NH-C}_6H_4\text{(o-CH}_3)$ | 81–82 | 81 |
| Stear-m-toluidide | $H_{35}C_{17}\text{C(=O)NH-C}_6H_4\text{(m-CH}_3)$ | 79–80.5 | 81 |
| N-Dodecylacetamide | $H_3\text{CC(=O)N-C}_{12}H_{25}$ | 51-14 52 | 53 |
| N-Octadecylcaprylamide | $H_{15}C_7\text{C(=O)NH-C}_{18}H_{37}$ | 76–78 |  |
| N-Octadecylcapramide | $H_{19}C_9\text{-C(=O)NH-C}_{18}H_{37}$ | 79–82 | 80 |
| N-Octyllauramide | $H_{23}C_{11}\text{C(=O)N-C}_8H_{17}$ | 58–59 | 57 |
| N-Octadecyl-lauramide | $H_{23}C_{11}\text{C(=O)NH-C}_{18}H_{37}$ | 83–84 | 80 |
| N-Benzyl-lauramide | $H_{23}C_{11}\text{-C(=O)NH-CH}_2\text{-C}_6H_5$ | 83–84 | 84 |
| N-Methyl-myristamide | $H_{27}C_{13}\text{-C(=O)NH-CH}_3$ | 76.5–77.5 | 78 |
| N-Octylmyristamide | $H_{27}C_{13}\text{C(=O)NH-C}_8H_{17}$ | 68.5–70 | — |

TABLE I-continued

| COMPOUND | FORMULA | MELTING POINT (°C.) | AVERAGE TRIGGER TEMPERATURE (°C.) |
|---|---|---|---|
| N-Dodecylpalmitamide | $H_{31}C_{15}-\underset{\underset{O}{\|}}{C}-\underset{\underset{H}{\|}}{N}-C_{12}H_{25}$ | 79.5–81.5 | 78 |
| N-Octylstearamide | $H_{35}C_{17}-\underset{\underset{O}{\|}}{C}-\underset{\underset{H}{\|}}{N}-C_{8}H_{17}$ | 79–80.5 | 80 |
| N-Dodecylstearamide | $H_{35}C_{17}-\underset{\underset{O}{\|}}{C}-\underset{\underset{H}{\|}}{N}-C_{12}H_{25}$ | 83–84 | 78 |
| N-Octylphthalimide | 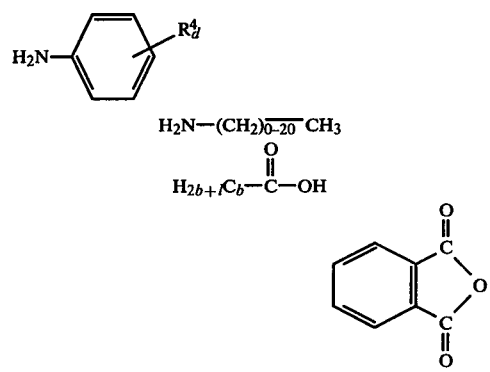 (NC$_8$H$_{17}$) | 46–47 | — |
| N-Dodecylphthalimide | (NC$_{12}$H$_{25}$) | 62–63 | 64 |
| N-Octadecylphthalimide | (NC$_{18}$H$_{37}$) | 78–79 | 80 |

The compounds of formula I may be easily prepared. Thus, for example, the compounds may be prepared by combining the necessary reactants in a suitable vessel in the presence of a solvent (e.g., xylene) and reacted at atmospheric pressure in an inert atmosphere until substantially all of the liberated water has been azeotropically removed. The reaction mixture may be heated to facilitate the reaction. However, certain of the reactions may be exothermic so that cooling may be necessary. Typically the reaction temperature is in the range of 140° C. to 210° C. Upon completion of the reaction, the mixture may be cooled (if necessary) and simultaneously diluted with alcohol to precipitate the compound. The precipitate may then be filtered from the mixture, washed with alcohol and air dried.

Typically reactants used in preparing the compounds of formula I are $$H_2N-\underset{R_d^4}{\underset{|}{\bigcirc}} \quad (V)$$

$$H_2N-(CH_2)_{\overline{0-20}}CH_3 \quad (VI)$$

$$H_{2b+1}C_b-\underset{\underset{O}{\|}}{C}-OH \quad (VII)$$

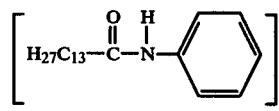 (VIII)

Reactants of formulae V and VII are useful in preparing compounds of formula II. Reactants of formulae VI and VII are useful in preparing compounds of formula III. Reactants of formulae VI and VIII are useful in preparing compounds of formula IV.

Specific examples of preparations of compounds of formula II, III, and IV are now set forth.

Preparation of Myristanilide $$\left[ H_{27}C_{13}-\underset{\underset{O}{\|}}{C}-\underset{\underset{H}{\|}}{N}-\bigcirc \right]$$

A three liter flask equipped with a stirrer, theremometer, nitrogen inlet, Barrett trap and condenser was used. Myristic acid (commercially available from Emery Chemicals, 97 percent purity, 685 grams, 3.0 moles), aniline (300 ml., 3.2 moles) and 120 ml xylene were charged to the flask. The mixture was stirred and heated for approximately 6½ hours at a temperature of from about 170° C.–220° C. The reaction was conducted in a nitrogen atmosphere. The reaction mixture was then cooled to 140° C. and poured into a 4 liter beaker. About 1.8 liters of denatured alcohol were slowly added to the reaction solution. After standing overnight, the slurry of semi-solid myristanilide was collected by filtration. The filter cake was washed thoroughly with two portions of denatured alcohol and then air dried at about 22° C. The resultant white crystalline solid weighed 706 grams and had a melting point of 83.5° C.–84.5° C.

Preparation of N-dodecylpalmitamide

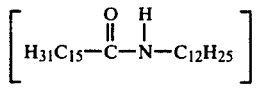

A 250 ml flask equipped with a stirrer, thermometer, nitrogen inlet, Barrett trap and condenser was used. Palmitic acid (commercially available as "Emersol" 144 from Emery Chemicals, 95% purity, 51.3 grams, 0.2 moles), dodecylamine (commercially available as "Armeen" 12D from Armak Chemicals, 97% purity, 37.1 grams, 0.2 mole) and 50 ml xylene were charged to the flask. The mixture was stirred and heated for approximately 2¼ hours at a temperature of from about 150° C. to 220° C. The reaction was conducted in a nitrogen atmosphere. The reaction mixture was cooled to 140° C. and added slowly to 250 milliliters of denatured alcohol. The resulting slurry of semi-solid N-dodecylpalmitamide was then heated on a steam bath until the solid dissolved. The bath was then cooled to room temperature (22° C.) and the resulting slurry was filtered. The collected solid was washed on the filter with 2 portions of alcohol and air dried at room temperature. The resultant white crystalline solid weighed 80 grams and had a melting point of about 79.5–81.5.

Preparation of N-octadecylphthalimide

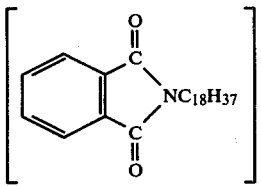

A 250 ml flask equipped with a stirrer, thermometer, nitrogen inlet, Barrett trap and condenser was used. Octadecylamine (commercially available as "Kemamine" P990D from Humko-Sheffield, Division of Kraftco Corporation, 90% purity, 53.9 grams, 0.2 moles), phthalic anhydride (99.5% purity, 29.6 grams, 0.2 mole), and 50 ml of xylene were added to the flask. The initial reaction of the phthalic anhydride and octadecylamine was moderately exothermic. The reaction was carried out in a nitrogen atmosphere. The mixture was reacted for approximately 1½ hours at a temperature of from about 140° C. to 200° C. The reaction mixture was then cooled to 140° C. and was added to approximately 250 ml of denatured alcohol. The resulting slurry of semi-solid N-octadecylphthalimide was then heated on a steam bath to dissolve the solids. After cooling to room temperature the precipitated solid was filtered off and washed with 2 portions of alcohol. The yield of white crystalline solid was 72.1 grams which had a melting point of about 78°–79° C.

Referring now to FIG. 1, there is shown thermally-responsive signaling device 10 comprising a housing 12 defining a cavity 14 and indicating means 16 within said cavity, a biasing means 18 within said cavity and a locking means 20 within said cavity.

Housing 12 has a closed end 22 and an open end 24. Closed end 22 is preferably pointed, as shown, although it is not necessary that it be so. Additionally, said end is preferably provided with a flange 26 which may either circumscribe housing 12 or project from only a portion thereof. In this latter case, flange 26 may also be referred to as a barb. In either event, flange 26 permits penetration of device 10 into the food to be prepared while preventing the tendency of the food to urge the device outwardly during preparation.

Figure 2:
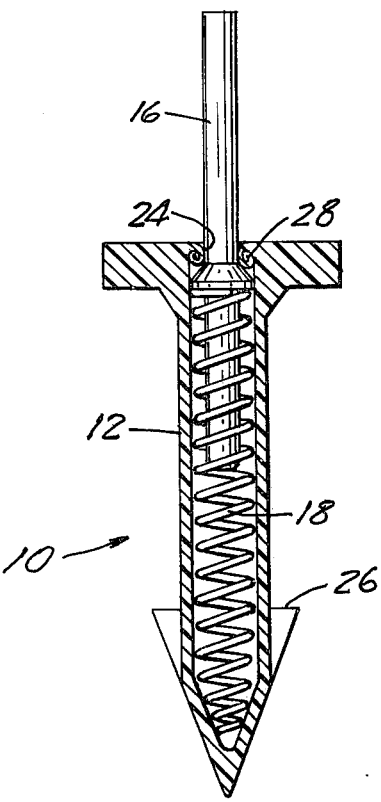
FIG. 2 is a cross-sectional view of the embodiment of FIG. 1 having the indicator rod in a raised position relative to the body of the device.

Open end 24 is provided with a reverse curl lip 28 which is adapted to slideably receive indicating means 16 and form a mating seal with shoulder 30 of said indicating means. (See FIG. 2).

Figure 3:
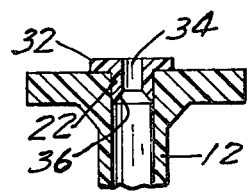
FIG. 3 is a cross-sectional view of the upper portion of an alternative embodiment of the invention.

Alternatively open end 24 may be provided with a cap 32 (see FIG. 3) rather than the reverse curl lip. In this embodiment, cap 32 is received within open end 24 of the housing 12. Cap 32 has a passage 34 therethrough which is in registry with the indicating means (not shown) and adapted to slideably receive said indicating means. Additionally, it is preferred that cap 32 have tapered shoulder 36 to form a mating seal with the shoulder of the indicating means.

The material of construction of housing 12 must be capable of (i) withstanding the rigors of the environment to which it is subjected and (ii) conducting the internal temperature of the article being cooked to the locking means relatively quickly. Moreover, it is preferred that the material be chemically inert. Representative of useful materials are metals (e.g., aluminum), glass, polymers (e.g., nylon, polypropylene, etc.).

The shape of housing 12 may vary. Circular cross-sections are preferred, but any shape, symmetrical or asymmetrical, may also be used.

Indicating means 16 is preferably axially disposed within cavity 14. In the embodiment shown, it is adapted so as to be substantially within said cavity prior to the attainment of a predetermined temperature and substantially outside of said cavity after the attainment of said predetermined temperature. However, it may also be adapted to operate in the opposite manner (e.g., raised prior to attainment of a predetermined temperature and lowered at the attainment of a predetermined temperature). Moreover, said indicating means may be disposed so as to rotate to an indicating position without changing its height relative to the housing. In any event, the exact type of movement of the indicating means relative to the housing is not critical to the invention.

Indicating means 16 may be constructed from the same materials used for housing 12. Additionally, it may have a variety of cross-sectional areas, although circular cross-sections are preferred.

The movement of indicating means 16 relative to housing 12 so as to indicate the attainment of a predetermined temperature is brought about by biasing means 18. In the embodiment shown, such movement is between lowered and raised positions, although, as pointed out above, other movements are also possible. Typically, said biasing means comprises a spring. Said spring is generally held in compression until such time as locking means 20 fuses, although it may be held in any configuration such that it can urge the indicating means to an indicating position.

Locking means 20 may either secure indicating means 16 directly to housing 12, or alternatively, it may directly restrain biasing means 18 (e.g., by joining said means to itself or encasing said means within the locking means). Moreover, a quantity of the locking means may be provided around the lower end of the indicating means so as to hold the biasing means in compression (or other configuration) between such point and the shoulder of the indicating means. Still other arrangements are also possible as will be understood by those skilled in the art and are included within the scope of the invention.

Thermally-responsive signaling devices of the invention may be easily assembled. For example, the embodiment shown in the figures may be assembled by forming a pellet of predetermined size of the material of the locking means; inserting it into the closed end of the housing; inserting the biasing means and indicating means into the housing; forming the reverse curldown lip at (or inserting the cap in) the open end; and heating the material of the locking means until it fuses. Methods of forming the reverse curldown lip are described in U.S. Pat. No. 3,965,849. The indicating means may then be urged toward the closed end of the device (thereby compressing the biasing means) and held in that position until the fused locking means material solidifies.

The assembled signaling devices are then preferably quality assurance-tested by heating them at a temperature slightly below the trigger temperature of the device for 2 hours. This test causes those devices which have received an insufficient amount of the material of the locking means to fire prematurely. Those devices which have received a sufficient amount of the material of the locking means do not fire prematurely in this test.

The trigger temperature of the devices of the invention may be affected by the reactants used to prepare the compounds of formula I. Commercially available starting materials frequently contain minor amounts of impurities. These impurities are usually closely related compounds which persist in the compound of formula I. The effect which these impurities have upon the trigger temperature is dependent upon the nature and amount of the impurities present.

The trigger temperature of the devices of the invention may also be slightly varied by the intentional incorporation of impurities into the locking means. Thus, for example, the trigger temperature of a myristanilide locking means may be lowered by the incorporation of a minor amount of myristic acid therein.

The thermally-responsive signaling devices described in the figures represent but two embodiments of the present invention. Still other embodiments are possible, as will be understood by those skilled in the art and are included within the scope of the following claims.

What is claimed is:

1. A thermally-responsive indicating device comprising a housing which defines a cavity closed at one end and open at the other end, an indicating means within said cavity for movement relative to said housing, a biasing means within said cavity for urging the movement of said indicating means relative to said housing, and a fusible locking means within said cavity for resisting movement of said indicating means by said biasing means, wherein said locking means is solid at about 20° C., and is adapted to fuse at a predetermined temperature and wherein said locking means has the formula

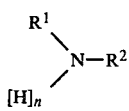

wherein R¹ is selected from

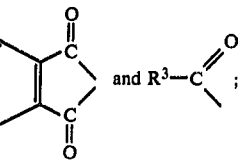

R² is selected from saturated aliphatic radicals, aryl radicals and aryl-substituted aliphatic radicals; R³ is a saturated aliphatic radical containing from about 1 to 20 carbon atoms; and n is 0 or 1; provided that (i) when R¹ is

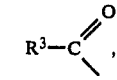

n is 0 and R² is a saturated aliphatic radical and (ii) when R¹ is $$R^3-C\diagup_{\diagdown}^{O}$$

n is 1, R² is selected from saturated aliphatic radicals, aromatic radicals and aryl-substituted aliphatic radicals; and provided further that the sum of the number of carbon atoms in R¹ and R² is at least about 10.

2. A thermally-responsive indicating device comprising a housing which defines a cavity closed at one end and open at the other end, an indicating means within said cavity for movement relative to said housing, a biasing means within said cavity for urging the movement of said indicating means relative to said housing, and a fusible locking means within said cavity for resisting movement of said indicating means by said biasing means, wherein said locking means is solid at about 20° C. and is adapted to fuse at a predetermined temperature and has the formula

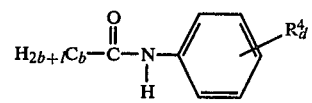

wherein R⁴ is a lower alkyl group containing from about 1 to 4 carbon atoms; b is an integer of from about 4 to 20; and d is 0 or 1.

3. A thermally-responsive indicating device according to claim 2 wherein d is 0.

4. A thermally-responsive indicating device according to claim 3 wherein b is from about 7 to 17.

5. A thermally-responsive indicating device according to claim 4 wherein b is 13.

6. A thermally-responsive indicating device according to claim 2 wherein d is 1.

7. A thermally-responsive indicating device according to claim 6 wherein R⁴ is a methyl group.

8. A thermally-responsive indicating device according to claim 7 wherein said methyl is ortho or para to the amino group.

9. A thermally-responsive indicating device according to claim 8 wherein b is from 7 to 17.

10. A thermally-responsive indicating device according to claim 9 wherein b is 8.

11. A thermally responsive indicating device comprising a housing which defines a cavity closed at one end and open at the other end, an indicating means within said cavity for movement relative to said housing, a biasing means within said cavity for urging the movement of said indicating means relative to said housing, and a fusible locking means within said cavity for resisting movement of said indicating means by said biasing means, wherein said locking means is solid at about 20° C., and is adapted to fuse at a predetermined temperature and has the formula

wherein $R^3$ is a saturated aliphatic radical containing from about 1 to 20 carbon atoms and $R^5$ is selected from saturated aliphatic radicals and aryl-substituted aliphatic radicals containing from about 1 to 20 carbon atoms, provided that the sum of the number of carbon atoms is $R^3$ and $R^5$ is at least about 13.

12. A thermally-responsive indicating device according to claim 11 wherein $R^5$ contains 12 carbon atoms.

13. A thermally-responsive indicating device according to claim 12 wherein $R^3$ contains 15 carbon atoms.

14. A thermally-responsive indicating device according to claim 12 wherein $R^3$ contains 17 carbon atoms.

15. A thermally-responsive indicating device according to claim 11 wherein $R^5$ contains 8 carbon atoms.

16. A thermally-responsive indicating device according to claim 15 wherein $R^3$ contains 17 carbon atoms.

17. A thermally-responsive indicating device according to claim 11 wherein $R^5$ contains 18 carbon atoms.

18. A thermally-responsive indicating device according to claim 17 wherein $R^3$ contains 9 carbon atoms.

19. A thermally-responsive indicating device according to claim 17 wherein $R^3$ contains 11 carbon atoms.

20. A thermally-responsive indicating device comprising a housing which defines a cavity closed at one end and open at the other end, an indicating means within said cavity for movement relative to said housing, a biasing means within said cavity for urging the movement of said indicating means relative to said housing, and a fusible locking means within said cavity for resisting movement of said indicating means by said biasing means, wherein said locking means is solid at about 20° C., and is adapted to fuse at a predetermined temperature and has the formula

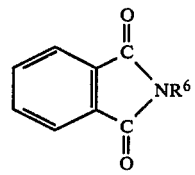

wherein $R^6$ is a saturated aliphatic radical of at least about 6 carbon atoms.

21. A thermally-responsive indicating device according to claim 20 wherein $R^6$ contains 18 carbon atoms.

* * * * *

UNITED STATES PATENT AND TRADEMARK OFFICE
CERTIFICATE OF CORRECTION

PATENT NO. : 4,170,956
DATED : October 16, 1979
INVENTOR(S) : Robert L. Wear

It is certified that error appears in the above–identified patent and that said Letters Patent are hereby corrected as shown below:

Col. 1, line 26, "3,682,120" should read --3,682,130--.

Col. 6, line 11, "51-14 52" should read --51-52--.

Col. 10, line 51, "showh" should read --shown--.

Signed and Sealed this

Twelfth Day of February 1980

[SEAL]

Attest:

SIDNEY A. DIAMOND

Attesting Officer

Commissioner of Patents and Trademarks